(12) United States Patent
Zamorano Alvear et al.

(10) Patent No.: US 11,110,660 B2
(45) Date of Patent: Sep. 7, 2021

(54) POWDER BUILD MATERIAL HANDLING

(71) Applicant: HEWLETT-PACKARD DEVELOPMENT COMPANY, L.P., Houston, TX (US)

(72) Inventors: Juan Manuel Zamorano Alvear, Sant Cugat del Valles (ES); Sergio De Santiago Dominguez, Sant Cugat del Valles (ES); Vicente Granados Asensio, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 241 days.

(21) Appl. No.: 16/097,608

(22) PCT Filed: Jul. 22, 2016

(86) PCT No.: PCT/US2016/043525
§ 371 (c)(1),
(2) Date: Oct. 29, 2018

(87) PCT Pub. No.: WO2018/017119
PCT Pub. Date: Jan. 25, 2018

(65) Prior Publication Data
US 2019/0152147 A1    May 23, 2019

(51) Int. Cl.
*B29C 64/329*    (2017.01)
*B29C 64/153*    (2017.01)
(Continued)

(52) U.S. Cl.
CPC .......... *B29C 64/329* (2017.08); *B29C 64/153* (2017.08); *B29C 64/295* (2017.08);
(Continued)

(58) Field of Classification Search
None
See application file for complete search history.

(56) References Cited

U.S. PATENT DOCUMENTS 6,007,318 A * 12/1999 Russell ................. B33Y 30/00
                                                     425/130
7,037,382 B2    5/2006 Davidson et al.
(Continued)

FOREIGN PATENT DOCUMENTS

CN        104723564         6/2015
CN        104959606        10/2015
(Continued)

OTHER PUBLICATIONS

"Hardcotton's Elemental pressure controlled SLA 3D printer launches on Kickstarter, starting at $950 AUD", Nov. 19, 2014, 11 pages, www.3Ders.org.
(Continued)

*Primary Examiner* — Ali Z Fadhel
(74) *Attorney, Agent, or Firm* — HP Inc. Patent Department

(57) ABSTRACT

Disclosed is a powder build material handling system for a three-dimensional printer. The system comprises a delivery system. The delivery system is to carry powder build material in a flow of gas from a powder build material supply. The delivery system is to filter the flow of gas to separate the powder build material from the flow of gas. The delivery system is to direct the filtered flow of gas to the powder build material supply to form a closed system.

17 Claims, 5 Drawing Sheets

(51) Int. Cl.
    *B29C 64/321* (2017.01)
    *B29C 64/295* (2017.01)
    *B33Y 40/00* (2020.01)
    *B41F 16/00* (2006.01)
    *B44B 1/02* (2006.01)
    *B43L 13/14* (2006.01)
    *B33Y 30/00* (2015.01)
    *B33Y 10/00* (2015.01)
    *C04B 111/00* (2006.01)
    *G03G 15/22* (2006.01)
    *G06F 113/10* (2020.01)

(52) U.S. Cl.
    CPC ............ *B29C 64/321* (2017.08); *B33Y 10/00* (2014.12); *B33Y 30/00* (2014.12); *B33Y 40/00* (2014.12); *B41F 16/008* (2013.01); *B41P 2219/43* (2013.01); *B43L 13/147* (2013.01); *B44B 1/02* (2013.01); *C04B 2111/00181* (2013.01); *F16C 2324/16* (2013.01); *G03G 15/224* (2013.01); *G06F 2113/10* (2020.01)

(56) References Cited

U.S. PATENT DOCUMENTS

| | | | |
|---|---|---|---|
| 7,137,431 B2 | 11/2006 | Ederer et al. | |
| 7,979,152 B2 | 7/2011 | Davidson | |
| 8,017,055 B2 | 9/2011 | Davidson et al. | |
| 2002/0059309 A1 | 5/2002 | Loy et al. | |
| 2004/0003738 A1* | 1/2004 | Imiolek | B33Y 50/00 101/480 |
| 2004/0012112 A1* | 1/2004 | Davidson | B33Y 10/00 264/109 |
| 2004/0217186 A1* | 11/2004 | Sachs | B41J 2/1429 239/11 |
| 2005/0053798 A1* | 3/2005 | Maekawa | B29C 64/106 428/542.8 |
| 2005/0280185 A1* | 12/2005 | Russell | B28B 7/465 264/308 |
| 2008/0006334 A1* | 1/2008 | Davidson | B33Y 30/00 137/571 |
| 2014/0202381 A1 | 7/2014 | Ederer et al. | |
| 2015/0224712 A1* | 8/2015 | Tjellesen | B29C 64/295 425/375 |
| 2015/0298397 A1* | 10/2015 | Chen | B29C 64/357 209/12.2 |
| 2017/0144374 A1* | 5/2017 | Ono | B29C 64/165 |
| 2018/0126650 A1* | 5/2018 | Murphree | B08B 5/04 |

FOREIGN PATENT DOCUMENTS

| | | |
|---|---|---|
| CN | 105382258 | 3/2016 |
| CN | 105772720 | 7/2016 |
| EP | 0659462 | 6/1995 |
| JP | 2016052777 | 4/2016 |
| JP | 2016056417 | 4/2016 |
| SU | 1717267 | 3/1992 |
| WO | WO2015131250 | 9/2015 |
| WO | WO2017184136 A1 | 10/2017 |

OTHER PUBLICATIONS

International Search Report and Written Opinion for International Application No. PCT/US2016/043525 dated May 4, 2017, 7 pages.
Maloney, L. D., "Mechatronics Fuels Revolution in 3D Printing", DesignNews, Jul. 16, 2007, 4 pages, < http://www.designnews.com/document.asp?doc_id=213342 >.

* cited by examiner

POWDER BUILD MATERIAL HANDLING

BACKGROUND

Some three-dimensional printing techniques use powdered build material that is formed in thin layers and portions of which are selectively solidified to form a layer of a 3D object. The powdered build material may be provided from a powder build material supply to the build area of the three-dimensional printer.

A 3D printer may generate 3D objects using one of a number of available different powder build materials.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

3D objects can be generated from powdered build material(s) using a 3D printer. In some examples, powder build material is delivered to a build area so that generating a 3D object with the powder build material may occur. In one example, powder build material may be delivered to a feed area by an Archimedes screw arrangement. In another example, powdered build material may be deposited on to a build area from above.

In examples of this disclosure, a powder build material handling system or method enables powder build materials having different properties to be handled. Suitable powder-based build materials may include at least one of polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide, thermo(setting) plastics, resins, transparent powders, colored powders, metal powder, ceramics powder such as for example, glass particles, and/or a combination of at least two of these or other materials, wherein such combination may include different particles each of different materials, or different materials in a single compound particle. Examples of blended build materials include alumide, which may include a blend of aluminum and polyamide, multi-color powder, and plastics/ceramics blends. Blended build material may comprise two or more different respective average particle sizes.

Figure 1:
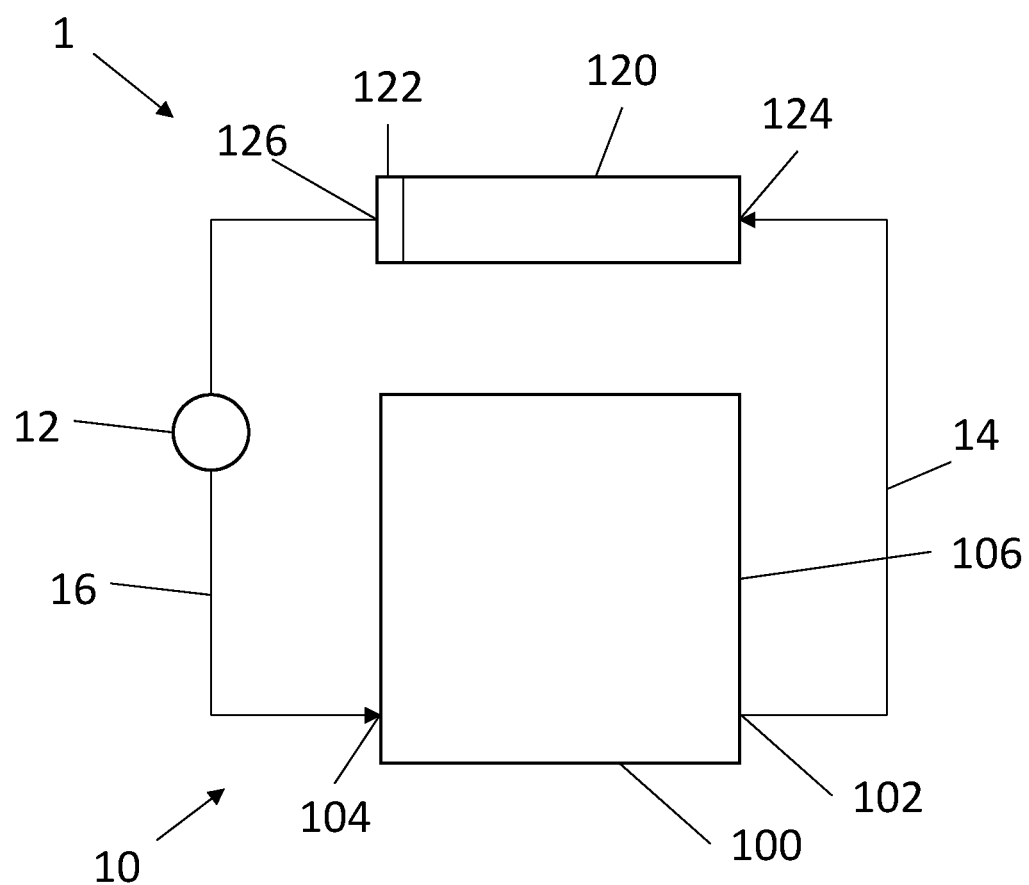
FIG. 1 is a schematic illustration showing a powder build material handling system according to an example.

FIG. 1 is a schematic diagram showing an example of a powder build material handling system 1 for a 3D printer. The system 1 comprises a delivery system 10.

In this example, the delivery system 10 is to carry or transport powder build material in a flow of gas from a powder build material supply 100, to filter the flow of gas to separate the powder build material from the flow of gas, and to direct the filtered flow of gas to the powder build material supply 100 to form a closed system. Accordingly, the filtered gas can be used to transport further powder from the powder build material supply 100. Additionally, a closed system reduces the risk of powder build material being lost to the environment surrounding the handling system 1.

In this example, the delivery system 10 is to carry powder build material from the powder build material supply 100 and to deliver the powder build material to a powder deposition zone 120. The powder deposition zone 120 may be in a build area of the 3D printer. The powder deposition zone 120 may be a buffer between the delivery system 10 and the build area. In an example, the delivery system 10 delivers the powder build material to the powder deposition zone 120 without altering characteristics of the powder build material, such as chemical properties of the powder build material and/or without causing the powder build material to undergo plastic transformation. In other examples, the delivery system 10 may be to additionally carry powder build material in a flow of gas between any other areas in the handling system 1.

In this example, the delivery system 10 comprises a first flow path 14 to connect an outlet 102 of the powder build material supply 100 to an inlet 124 of the powder deposition zone 120 and a second flow path 16 to connect an outlet 126 of the powder deposition zone 120 to an inlet 104 of the powder build material supply 100. In this example, the delivery system 10 is to carry powder build material in the flow of gas from the powder build material supply 100 to the powder deposition zone 120 via the first flow path 14 and to direct the filtered flow of gas from the powder deposition zone 120 to the powder build material supply via the second flow path 16. In this example, the first flow path 14 and the second flow path 16 are formed by tubes. In other examples, other constructions of the first and second flow paths 14, 16 may be used. In other examples, the flow of gas may flow along any other suitable flow path that allows the delivery system 10 to fulfill its function.

The delivery system 10 comprises a filter 122 to filter the flow of gas to separate the powder build material from the flow of gas. In this example, the filter 122 is located to deposit the powder build material at the powder deposition zone 120, by filtering the flow of gas as the flow of gas leaves the powder deposition zone 120 in use. The filter 122 is located between the powder deposition zone 120 and the powder build material supply 100. In this example, the filter is located between the powder deposition zone 120 and the second flow path 16. For example, the filter 122 is located at the outlet 126 of the powder deposition zone 120. The filter 122 allows the filtered flow of gas to return to the powder build material supply 100, where powder build material enters the filtered flow of gas. The flow of gas will thus carry further powder build material to the powder deposition zone 120 before being filtered by the filter 122 again.

In this example, the delivery system 10 comprises a pump 12 to generate the flow of gas. For example, the pump 12 may be a vacuum pump. In an example, the pump 12 is located downstream of the filter 122 and in the second flow path 16, so that the flow of gas passing through the pump 12 is the filtered flow of gas. Therefore, the pump should not be subjected to powder build material. Locating the pump 12 downstream of the filter 122 helps to reduce sedimentation of powder build material in the pump 12 because the gas passing through the pump 12 is filtered. The pump 12 causes the flow of gas to flow from the pump 12, to the powder build material supply 100, to the powder deposition zone 120 and back to the pump 12 via the filter 122.

In an example, the delivery system 10 is to carry the powder build material at a flow rate of the flow of gas selected in dependence on a property of the powder build material. The property of the powder build material may be, for example, particle size, bulk density, or flowability of the powder build material. In an example, the pump 12 generates a predetermined flow rate of the flow of gas in dependence on the type of powder build material to be carried in the flow of gas. In an example, the flow rate of the flow of gas is determined in dependence on a quantity of powder to be carried in the flow of gas over a period of time or a quantity of powder to be delivered to the powder deposition zone 120 over a period of time.

In an example, the handling system 1 comprises a user-interface (not shown), by which a user may provide an input to determine the flow rate generated by the pump 12. By way of further example, the user may input a desired flow rate, data representing the flow rate itself, data representing a part to be generated by the 3D printer in which the handling system 1 is used, data representing a quantity of powder to be carried in the flow of gas over a period of time and/or data representing an identification of the powder build material to be carried. In some examples, the handling system 1 comprises a device for correlating input data or input parameters with a flow rate to be generated by the pump 12.

In this example, the powder build material supply 100 is positioned beneath the powder deposition zone 120. The footprint of the handling system 1 is therefore reduced, which may help reduce the overall size of the 3D printer in which the handling system 1 is used. In another example, the powder build material supply 100 may be at any other location in relation to the powder deposition zone 120, such as laterally adjacent the powder deposition zone 120.

In some examples, the system 1 comprises the powder build material supply 100. In some examples, the powder build material supply 100 comprises a reservoir or container 106 for storing powder build material. The reservoir or container 106 is made of any suitable material for storing powder build material. For example, the reservoir or container 106 comprises plastic(s) and/or metal(s) or the like. In an example, the powder build material supply 100 is insulated. This may help reduce the risk of powder build material stored in the reservoir or container 106 reaching a temperature at which the characteristics of the powder are changed.

Figure 2:
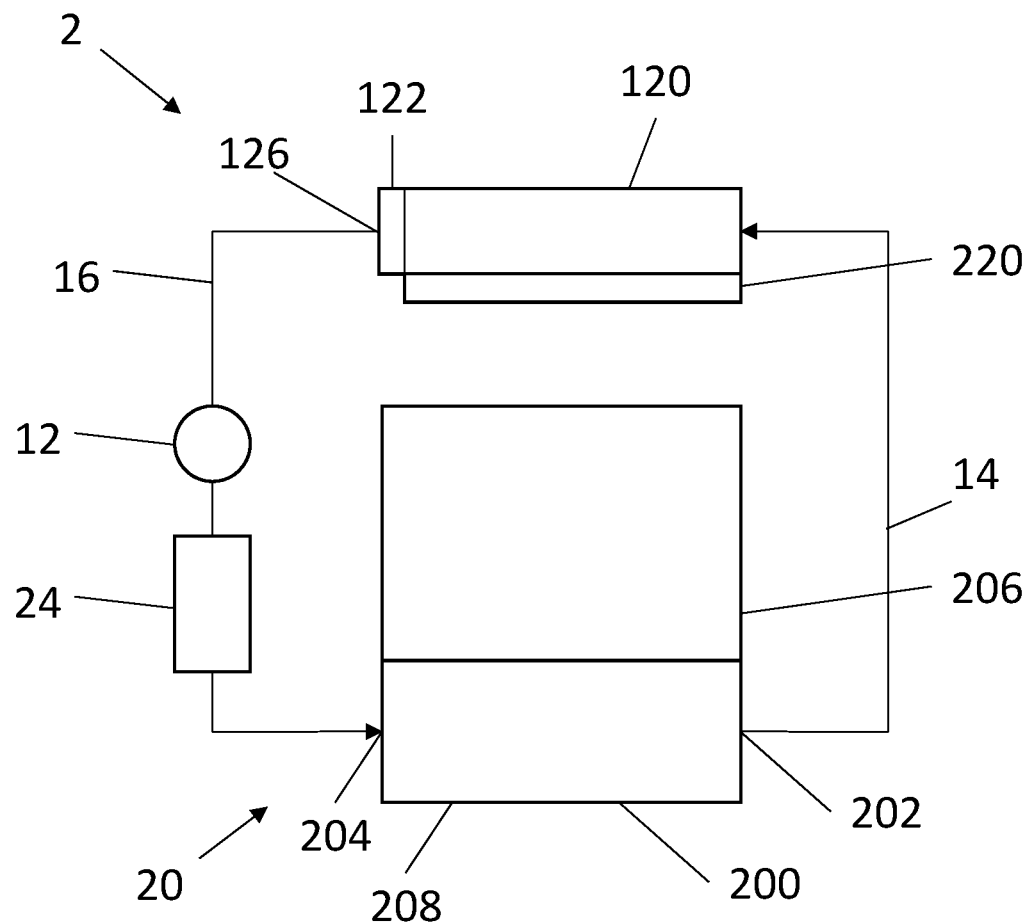
FIG. 2 is a schematic illustration showing a powder build material handling system according to an example.

FIG. 2 is a schematic diagram showing an example of another powder build material handling system 2 for a 3D printer. The handling system 2 has all the features of the handling system 1 of FIG. 1 and is described hereafter with like features having the same reference numerals as those used in FIG. 1. The handling system 2 of FIG. 2 comprises a delivery system 20 to deliver powder build material from a powder build material supply 200 to a powder deposition zone 120. In some examples, the handling system 2 comprises the powder build material supply 200. In some examples, the handling system 2 comprises the powder deposition zone 120.

The delivery system 20 of the handling system 2 of FIG. 2 comprises a heater 24 to heat the flow of gas. The heater 24 in use is to apply heat to the flow of gas and thus to powder build material that is carried in the heated flow of gas. In this example, the heater 24 is positioned in the second flow path 16. More specifically, in this example, the heater 24 is positioned between the pump 12 and the powder build material supply 200. In other examples, the heater 24 is positioned elsewhere in the handling system 2, such as between the filter 122 and the pump 12. In still another example, the pump 12 comprises the heater 24. In an example, the heater 24 is a convection heater. In still further examples, the heater 24 may be omitted.

In this example, the heater 24 in use applies heat to the filtered flow of gas. The filtered and heated flow of gas is directed along the second flow path 16 and enters the powder build material supply 200 at an inlet 204. As the filtered and heated flow of gas passes through the powder build material supply 200, powder build material enters the filtered and heated flow of gas. As the flow of gas subsequently passes through an outlet 202 of the powder build material supply 200 and along the first flow path 14, the thermal energy of the heated flow of gas is transferred to the powder build material carried in the heated flow of gas. As a result, the average temperature of powder build material at the powder deposition zone 120 is greater than the average temperature of powder build material at the powder build material supply 200.

In an example, the heater 24 heats the flow of gas to a temperature selected in dependence on a property of the powder build material. In an example, the heater 24 heats the flow of gas to a predetermined temperature based on the type of powder build material to be carried in the flow of gas. For example, the predetermined temperature may be below a temperature at which plastic transformation of the powder build material occurs. In an example, the heater 24 heats the flow of gas to a temperature selected in dependence on a temperature for generating a 3D object with the powder build material, Such an example may reduce the energy expended by the 3D printer to heat the powder build material to a temperature at which the powder build material can be used to generate a 3D object. Therefore, the powder build material at the powder deposition zone 120 is closer to the temperature for generating a 3D object with the powder build material, and thus any pre-heating at the powder deposition zone 120 may be negated or at least reduced in intensity or duration, for example.

In some examples, the heater 24 may heat the flow of gas to 50° C. In some examples, the heater 24 may heat the flow of gas to 150° C. In other examples, the heater 24 may heat the flow of gas to between 35° C. and 200° C., such as to between 50° C. and 150° C. In some examples, the temperature is dependent on the nature of the powder build material to be carried. For example, different types of powder build material conduct heat at different rates, so the temperature of the flow of gas may be altered accordingly. As another example, the temperature of the flow of gas may be dependent on the flow rate of the flow of gas.

In an example, the handling system 2 comprises a user-interface (not shown), by which a user may provide an input to determine the temperature to which the heater 24 heats the flow of gas. By way of further example, the user may input a desired flow rate, a desired temperature, data representing a quantity of powder to be carried in the flow of gas over a period of time and/or data representing an identification of the powder build material to be carried. In some examples, the handling system 2 comprises a device for correlating input data or input parameters with a temperature to which the heater 24 heats the flow of gas.

In an example, the closed nature of the handling system 2 increases the efficiency of the handling system 2. Latent heat in the flow of gas may remain as the flow of gas is filtered and returned along the second flow path 16 to the heater 24. Therefore, the heater 24 may be controlled to decrease its output energy over time whilst maintaining a constant temperature of the flow of gas. In an example, the handling system 2 comprises a device for monitoring the temperature of the flow of gas in the handling system 2. For example, the handling system 2 may comprise a thermometer or temperature sensor and a device to provide feedback to be used in controlling the heater 24.

In this example, the handling system 2 comprises a powder build material distributor 220. The distributor 220 distributes powder build material that is separated from the flow of gas. In this example, the powder build material is separated from the flow of gas by the filter 122 and deposited in the powder deposition zone 120. In an example, the distributor 220 comprises a spreader which traverses the powder deposition zone 120 and distributes powder build material substantially uniformly over the powder deposition zone 120. In another example, the distributor 220 comprises a shaker to shake powder build material in the powder deposition zone 120 so that the powder build material is distributed substantially uniformly over the powder deposition zone 120. In some examples, in which the powder build material comprises differently-natured particles, the shaker may help to distribute the differently-natured particles homogenously in the powder deposition zone 120.

In some examples, the distributor 220 operates continuously when the delivery system 20 is in use. In other examples, the distributor 220 operates at predetermined intervals. For example, the predetermined intervals may correlate to a period of time for a predetermined quantity of powder build material to be deposited in the powder deposition zone 120. For example, the predetermined intervals may relate to a period of time taken to generate a layer of the 3D object to be generated by the 3D printer in which the handling system 2 is used. In some examples of the handling system 2, the distributor 220 may be omitted.

In this example, the powder build material supply 200 comprises a reservoir 206 and a powder sampler 208 to take a sample of powder build material from powder build material in the reservoir 206.

In some examples, the powder sampler 208 separates a discrete sample of powder build material from the powder build material in the reservoir 208 and deposits the sample in the flow of gas. In other examples, the powder sample 208 deposits the sample in an intermediate area prior to the sample being transferred into the flow of gas.

In this example, the sample of powder build material from the powder sampler 208 enters the flow of gas at a location between the inlet 204 and the outlet 202 of the powder build material supply 200.

In some examples, the powder sampler 208 removes a sample of powder build material from the reservoir 206 at predetermined intervals. In an example, the predetermined interval is dependent on the quantity of additive in the sample of powder build material removed from the reservoir 206 by the powder sampler 208. By way of further example, the predetermined interval may be dependent on the type of powder in the reservoir 206, the flow rate of the flow of gas and the quantity of powder build material to be delivered to the powder deposition zone 120 over a period of time. The handling system 2 may comprise a user interface by which a user may provide an input to determine the interval at which samples are removed from the reservoir 206 by the powder sampler 208 or to determine the quantity of powder build material removed from the reservoir 206 by the powder sampler 208 at each interval or over a particular period of time.

In some examples, the powder sampler 208 comprises a powder build material flow regulator to regulate a rate at which powder build material exits the reservoir 206 to enter the flow of gas. In some examples, the powder build material exits the reservoir 206 under the force of gravity. In some examples, the reservoir 206 comprises a device to urge powder build material in the reservoir 206 towards the powder sampler 208.

In some examples of the handling system 2, the reservoir 206 may be omitted. In some examples of the handling system 2, the powder sampler 208 may be omitted.

In some examples, the handling system 2 comprises a powder build material distributor (not shown) to distribute the sample of powder build material separated from powder build material in the reservoir 206 by the powder sampler 208. This distributor may be of one of the constructions described above with reference to the distributor 220. In an example, the distributor helps to remove a more homogenous sample of powder build material from the reservoir 206. A homogenous sample of powder build material can help to maintain the composition of the powder build material while the powder build material is carried by the delivery system 20 from the powder build material supply 200. This may be particularly relevant if the powder build material in the reservoir 206 is heterogeneous and the sample of powder build material would otherwise comprise an incorrect composition of powder build material particles. In other examples, the further distributor may distribute the sample when the sample is in the intermediate area referred to above.

In other examples, the delivery system 20 may be to additionally carry powder build material in a flow of gas between any other areas in the handling system 2.

Figure 3:
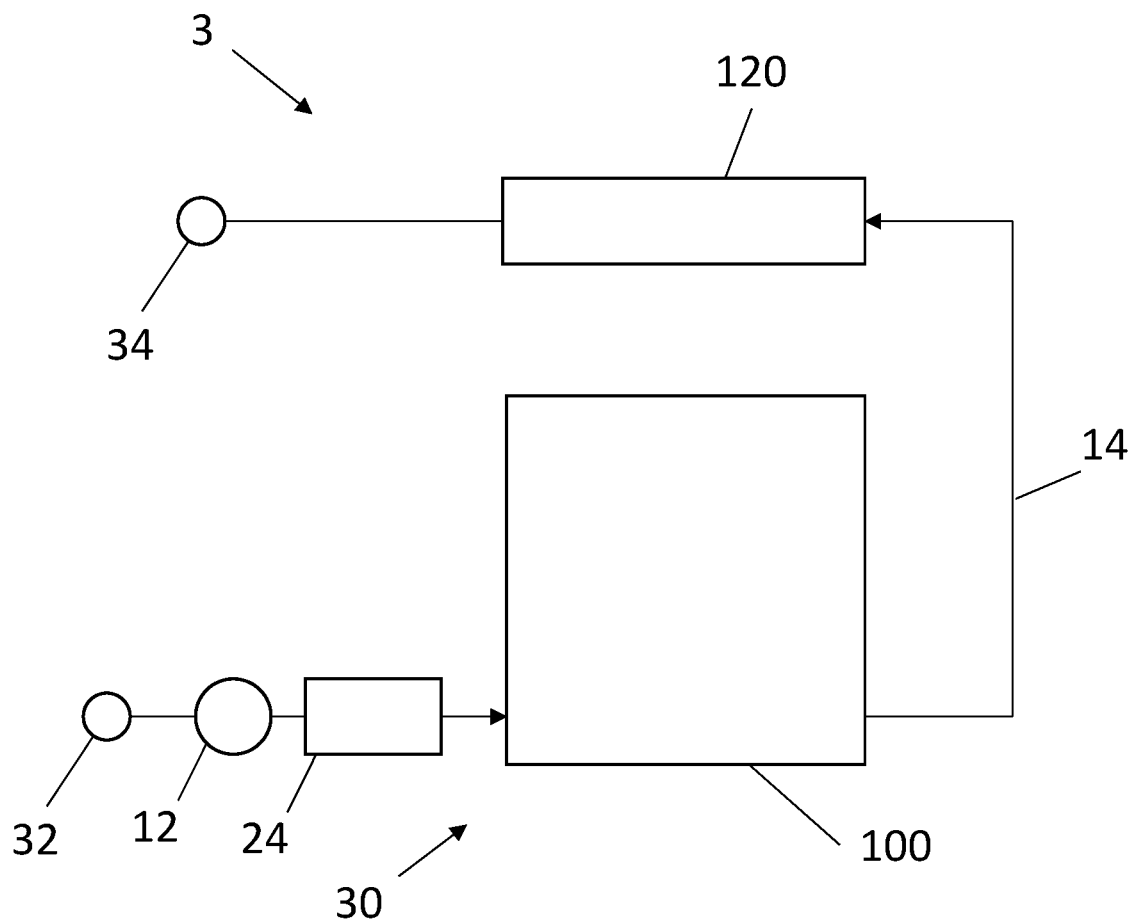
FIG. 3 is a schematic illustration showing a powder build material handling system according to an example.

FIG. 3 is a schematic diagram showing an example of another powder build material handling system 3 for a 3D printer. The handling system 3 has several of the features of the handling system 1 of FIG. 1 and is described hereafter with like features having the same reference numerals as those used in FIG. 1.

The powder build material handling system 3 comprises a delivery system 30 to carry powder build material in a flow of gas from a powder build material supply 100 to a powder deposition zone 120. The delivery system 30 comprises a pump 12 to generate the flow of gas, a heater 24 to heat the flow of gas, a flow path 14 connecting the powder build material supply 100 with the powder deposition zone 120, an inlet 32, and an outlet 34. In some examples, the handling system 3 comprises a powder build material supply 100 for supplying powder build material, In this example, the pump 12 is located upstream of the powder build material supply 100 and draws gas from the inlet 32 of the delivery system 30. That is, the pump 12 is located between the inlet 32 of the delivery system 30 and the powder build material supply 100. The pump 12 pumps the flow of gas to the powder build material supply 100, and then to the powder deposition zone 120 via the flow path 14. In this example, the flow of gas exits the delivery system 30 at the outlet 34 of the delivery system 30. The outlet 34 of the delivery system 30 is downstream of the powder deposition zone 120. That is, the powder deposition zone 120 is located between the flow path 14 and the outlet 34 of the delivery system 30. In other examples, the pump 12 may be omitted in favor of a different mechanism for generating a flow of gas through the delivery system 30. For example, a pressure at the inlet 32 of the delivery system 30 may be higher than a pressure at the outlet 34 of the delivery system 30, The heater 24 is the same as the heater 24 described with reference to FIG. 2. In this example, the heater 24 is located between the pump 12 and the powder build material supply 200. In other examples, the heater is located elsewhere in the handling system 3, such as between the inlet 32 of the delivery system 30 and the pump 12. In still another example, the pump 12 comprises the heater 24. In an example, the heater 24 is a convection heater.

In other examples, the delivery system 30 may be to additionally carry powder build material in a flow of gas between any other areas in the handling system 3.

Figure 4:
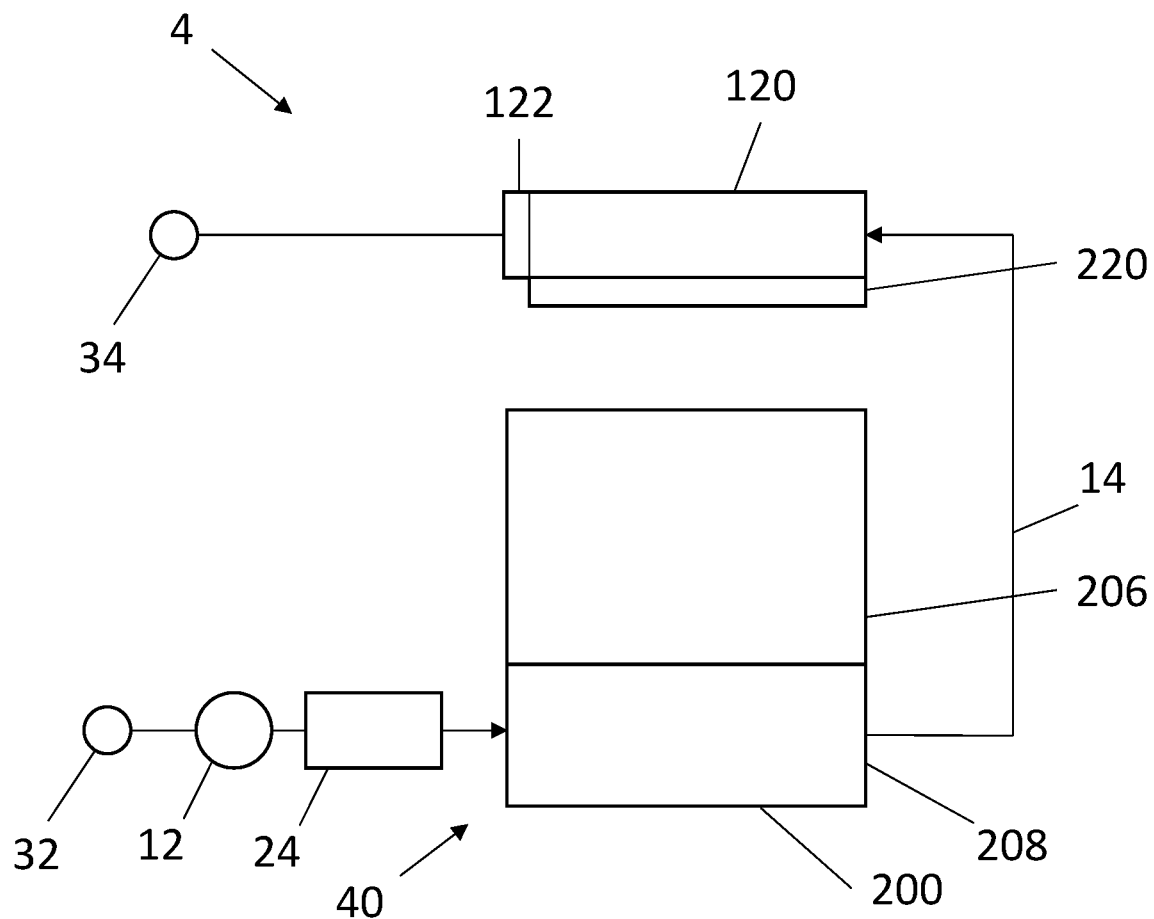
FIG. 4 is a schematic illustration showing a powder build material handling system according to an example.

FIG. 4 is a schematic diagram showing an example of another powder build material handling system 4 for a 3D printer. The handling system 4 has all the features of the handling system 3 of FIG. 3 and several features of the handling system 2 of FIG. 2. The handling system 4 of FIG. 4 is described hereafter with like features having the same reference numerals as those used in FIGS. 2 and 3.

The handling system 4 comprises a delivery system 40. The delivery system 40 is to carry powder build material in a flow of gas from a powder build material supply 200 to a powder deposition zone 120. In this example, the delivery system 40 comprises a pump 12 to generate the flow of gas, a heater 24 to heat the flow of gas, a flow path 14 connecting the powder build material supply 100 with the powder deposition zone 120, an inlet 32, and an outlet 34. In some examples, the handling system 4 comprises a powder build material supply 200. In some examples, the handling system 4 comprises the powder deposition zone 120

In this example, the pump 12 and the heater 24 are the same as the pump 12 and the heater 24 of the handling system 3 of FIG. 3. In other examples, the pump 12 and/or the heater 24 may instead take one of the alternative forms of pump and heater described herein, In this example, the pump 12 and the heater 24 are located at positions in the handling system 4 corresponding to those of the pump 12 and the heater 24 of the handling system 3 of FIG. 3. In other examples, the pump 12 and/or the heater 24 may be located at one of the alternative possible positions described herein. In some examples, the pump 12 may be omitted in favor of a different mechanism for generating a flow of gas through the delivery system 40, such as one of the mechanisms discussed above.

The delivery system 40 effectively is the same as the delivery system 20 as described with reference to FIG. 2, except that the second flow path 16 of delivery system 20 is omitted from the delivery system 40 of FIG. 4. In this example, the delivery system 40 comprises the powder build material distributor 220 to distribute powder build material separated from the flow of gas at the powder deposition zone 120, and the filter 122 to filter the flow of gas at an outlet of the powder deposition zone 120. In some examples, the distributor 220 may be omitted. In some examples, the filter 122 may be omitted.

In this example, the powder build material supply 200 comprises the reservoir 206 and the powder sampler 208 as described above with reference to FIG. 2. In some examples, the powder sampler 208 may be omitted. In some examples, the reservoir 206 may be omitted.

In some examples, the handling system 4 comprises a distributor to distribute the sample of powder build material separated from powder build material in the reservoir 206 by the powder sampler 208, as described with reference to FIG. 2. Such a distributor may be of one of the constructions described above with reference to the distributor 220 of FIG. 2.

In other examples, the delivery system 40 may be to additionally carry powder build material in a flow of gas between any other areas in the handling system 4.

Figure 5:
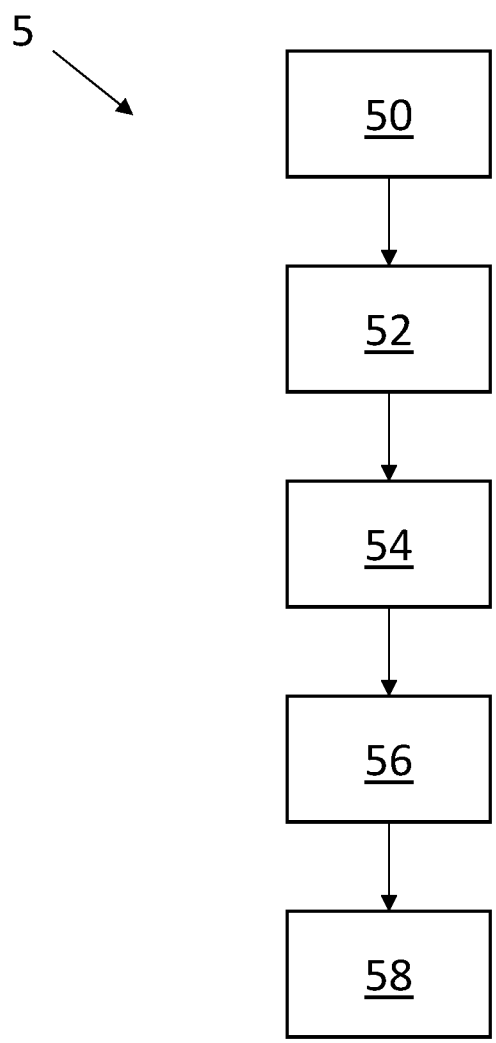
FIG. 5 is a flow chart showing a method according to an example.

FIG. 5 is a flow chart showing a method 5 according to an example. The method may be implemented using one of the respective handling systems 1, 2, 3, 4 shown in FIGS. 1 to 4. In this example, the method 5 is a method of handling powder build material for use in generating a 3D object. The method 5 comprises transporting 50, in a flow of gas, powder build material from a powder build material supply 100, 200 of a 3D printer, filtering 52 the flow of gas to deposit the powder build material from the flow of gas, and returning 54 the flow of gas to the powder build material supply 100, 200 after the filtering.

In some examples, the transporting 50 comprises carrying powder build material in a flow of gas from the powder build material supply 100, 200 to a powder deposition zone 120 via a first flow path 14. In some examples, the rate at which the powder build material is transported in the flow of gas is in dependence on the type of powder build material to be carried in the flow of gas.

In some examples, the filtering 52 is performed by a filter 122. In some examples, the filter 122 is at an outlet 126 of a powder deposition zone 120. The filtering 52 removes powder build material from the flow of gas and helps to deposit the powder build material in the powder deposition zone 120. In some examples, the method 5 comprises distributing powder build material in the powder deposition zone 120. For example, the distributing may be performed by a powder build material distributor 220 to uniformly and/or homogenously distribute powder build material in the powder deposition zone 120.

In some examples, the returning 54 the flow of gas to the powder build material supply 100, 200 after the filtering is via a second flow path 16. The second flow path 16 may connect the powder deposition zone 120 to the powder build material supply 100, 200. In some examples, the second flow path 16 comprises a pump 12 to generate the flow of gas.

In some examples, the method 5 comprises heating 56 the flow of gas. In some examples the heating 56 is by a heater 24 and occurs during the returning 54 of the flow of gas to the powder build material supply 100, 200. In some examples, the heating 56 comprises heating the flow of gas to a predetermined temperature in dependence on a property of the powder build material. For example, the heater 24 may heat the flow of gas to a predetermined temperature based on the type of powder build material to be carried in the flow of gas. Such an operation may reduce the energy expended by the 3D printer to heat the powder build material to a temperature at which the powder build material can be used to generate a 3D object.

The some examples, the method 5 comprises depositing 58 a homogenous sample of powder build material in the flow of gas at the powder build material supply 100, 200. The depositing 58 may be by a powder sampler 208. In some examples, the powder sampler 208 removes a sample of powder build material from a reservoir 206 of powder build material and deposits the sample in the flow of gas. In some examples, the depositing 58 comprises distributing the sample substantially homogenously before depositing 58 the sample in the flow of gas. In other examples, the sample may be homogenous when removed from the reservoir 206 by the powder sampler 208.

In some examples, one or more of the operations of the method 5 may be controlled on the basis of one or more inputs provided by a user to a user interface.

In some examples, the method 5 additionally comprises transporting, in a flow of gas, powder build material between other areas in a powder build material handling system 1, 2, 3, 4 of a 3D printer.

In the foregoing examples, the flow of gas is a flow of air. However, in respective variations to these examples, the gas may be other than air. For example, the gas may be an inert gas such as nitrogen or argon. In some examples, the gas may be selected to meet relevant standards for the handling system 1, 2, 3, 4 or the 3D printer in which the handling system 1, 2, 3, 4 is used.

The preceding description has been presented to illustrate and describe examples of the principles described. This description is not intended to be exhaustive or to limit these principles to any precise form disclosed. Many modifications and variations are possible in light of the above teaching.

What is claimed is:

1. A powder build material handling system for a three-dimensional printer, the system comprising:
    a reservoir at a location physically separate from a build area, to store a supply of powder build material; and
    a delivery system to carry powder build material in a flow of gas from the reservoir, to filter the flow of gas to separate the powder build material from the flow of gas, to deposit powder build material separated from the flow of gas to a powder deposition zone in the build area, and to direct the filtered flow of gas to the reservoir to form a closed system.

2. The system of claim 1, wherein the delivery system comprises a heater to heat the flow of gas.

3. The system of claim 1, wherein the delivery system comprises a heater is to heat the filtered flow of gas.

4. The system of claim 3, wherein the heater is to decrease its energy output over time to maintain a constant temperature of the flow of gas.

5. The system of claim 3, wherein the delivery system comprises:
    a first flow path to connect an outlet of the reservoir to an inlet of the powder deposition zone;
    a second flow path to connect an outlet of the powder deposition zone to an inlet of the reservoir; and
    a pump to circulate a flow of gas along the first flow path and the second flow path via the reservoir and the powder deposition zone;
    wherein the heater is to heat the flow of gas as the flow of gas passes along the second flow path.

6. The system of claim 5, wherein the delivery system comprises a filter to filter powder build material from the flow of gas at the outlet of the powder deposition zone.

7. The system of claim 1, wherein the delivery system comprises a vacuum pump to generate the flow of gas.

8. The system of claim 1, comprising a powder build material distributor to distribute powder build material separated from the flow of gas and deposited in the powder deposition zone.

9. The system of claim 1, comprising a powder sampler to separate a sample of powder build material from powder build material in the reservoir and deposit the sample in the flow of gas.

10. The system of claim 9, wherein the powder sampler is to separate a sample of powder build material from powder build material in the reservoir at intervals dependent on a type of powder build material in the reservoir, a flow rate of the flow of gas, and/or a quantity of powder build material to be delivered to the powder deposition zone.

11. A method for a three-dimensional printer, comprising:
    storing a supply of powder build material in a reservoir at a location physically separate from a build area of the printer;
    transporting, in a flow of gas, powder build material from the reservoir;
    filtering the flow of gas to separate the powder build material from the flow of gas;
    depositing powder build material separated from the flow of gas to a powder deposition zone in the build area; and
    returning the flow of gas to the reservoir after the filtering.

12. The method of claim 11, comprising heating the flow of gas.

13. The method of claim 12, wherein the heating comprises heating the flow of gas to a predetermined temperature in dependence on a property of the powder build material.

14. The method of claim 11, comprising depositing a homogeneous sample of powder build material in the flow of gas at the reservoir.

15. The method of claim 11, comprising varying a flow rate of the flow of gas in dependence on a particle size of the powder build material, a bulk density of the powder build material, and/or a flowability of the powder build material.

16. The method of claim 11, comprising varying a flow rate of the flow of gas in dependence on a quantity of powder build material to be carried in the flow of gas over a period of time and/or a quantity of powder build material to be delivered to the powder desposition zone over a period of time.

17. The method of claim 12, wherein the heating comprises decreasing an energy output over time whilst maintaining a constant temperature of the flow of gas.

* * * * *